United States Patent [19]

Hibino et al.

[11] Patent Number: 5,709,791
[45] Date of Patent: Jan. 20, 1998

[54] METHOD FOR PRODUCING OXYGEN AND HYDROGEN

[75] Inventors: Kouetsu Hibino, Susono; Kyoichi Tange, Mishima, both of Japan

[73] Assignee: Toyota Jidosha Kabushiki Kaisha, Toyota, Japan

[21] Appl. No.: 609,346

[22] Filed: Mar. 1, 1996

[30] Foreign Application Priority Data

| Mar. 1, 1995 | [JP] | Japan | 7-041838 |
| Mar. 6, 1995 | [JP] | Japan | 7-045514 |
| Feb. 26, 1996 | [JP] | Japan | 8-038085 |

[51] Int. Cl.$^6$ .............. C01B 7/01; C01B 7/19; C25B 1/00; C25B 1/24
[52] U.S. Cl. .......... 205/464; 205/340; 205/498; 205/633; 205/637; 204/157.4; 204/157.48; 423/483; 423/580.1; 423/580.2; 423/644
[58] Field of Search .............. 205/340, 498, 205/633, 637, 464; 204/157.48, 157.4; 423/481, 483, 580.1, 580.2, 644

[56] References Cited

U.S. PATENT DOCUMENTS

| 1,870,308 | 8/1932 | Behrman | 423/486 |
| 4,140,603 | 2/1979 | Gomberg | 204/157.1 H |
| 4,182,662 | 1/1980 | Hart | 204/101 |
| 4,258,026 | 3/1981 | O'Keefe et al. | 423/648 R |
| 5,322,674 | 6/1994 | Mori | 423/481 |

FOREIGN PATENT DOCUMENTS 0 251 731 of 1988 European Pat. Off. .
55-21587 2/1980 Japan .
58-176102 10/1983 Japan .
4-243903 9/1992 Japan .

OTHER PUBLICATIONS

Chemical Abstract, 58–176102, Production of Hydrogen Oct. 1983.
Shindo et al., Kinetics of the Catalytic Decomposition of Hydrogen Iodide in the Thermochemical Hydrogen Production, Int. J. Hydrogen Energy, vol. 9, No. 8, pp. 695–700, 1984 month unavailable.
Chemical Abstract, vol. 118, No. 4, 25 Jan. 1993 Columbus, Ohio US; abstract No. 24607, XP000376374 *abstract* & JP-A-04 243 903 (Toyota Motor Corp.) 1 Sep. 1992.
Chemical Abstracts, vol. 100 No. 6, 6 Feb. 1984 Columbus, Ohio US; abstract No. 36454, XP002003745 *abstract* & JP-A-58 176 102 (Toshiba Corp.) 15 Oct. 1983.
International Journal of Hydrogen Energy, vol. 14, No. 9, 1989, Oxford GB, pp. 681–682, XP002003887 K. Tennakome: "Hydrogen from bromine electrolysis: a new approach" *p. 681, col. 1, line 26–column 2, line 18*.

Primary Examiner—Kathryn L. Gorgos
Assistant Examiner—Edna Wong
Attorney, Agent, or Firm—Oblon, Spivak, McClelland, Maier & Neustadt, P.C.

[57] ABSTRACT

There are provided a method of producing a hydrogen halide and oxygen by reacting water with a halogen using activated carbon as a catalyst, a method of producing hydrogen by thermal decomposition of a hydrogen halide using chromium oxide as a catalyst, and a method of producing oxygen and hydrogen by combining these two methods.

16 Claims, 7 Drawing Sheets

METHOD FOR PRODUCING OXYGEN AND HYDROGEN

BACKGROUND OF THE INVENTION

1. Field of the Invention

The present invention relates to a method for producing oxygen and hydrogen by reacting water with a halogen through a chemical reaction. Specifically, the present invention relates to a method for generating a hydrogen halide and oxygen by reacting water with a halogen, to a method for decomposing the hydrogen halide to hydrogen, and to a combination of these methods as a method for producing oxygen and hydrogen.

2. Description of the Related Art

Much attention has been directed in recent years to the environmental problem of global warming due to trace gases in the atmosphere, particularly carbon dioxide. That is, with increasing concentration of carbon dioxide in the atmosphere, infrared rays emitted from the surface of the earth are more strongly absorbed by the carbon dioxide, and the transmittance of infrared rays decreases, consequently raising the temperature at the earth's surface. Fossil fuels, which are presently the most widely used source of energy, inevitably generate carbon dioxide upon combustion. Various proposals of alternative clean energies have been made with the goal of minimizing the generation of carbon dioxide. Among them, hydrogen energy is receiving attention as a reproducible, clean source of energy which by nature contains no carbon and thus generates no carbon dioxide, and returns to water after conversion to energy.

At present, 99% of hydrogen is produced using fossil fuels as the raw materials. It is produced, for example, by steam reforming from naphtha gas and by water gas reaction of coal. However, since these methods use fossil fuels as the raw materials, they entail problems such as carbon dioxide generation, high electrical power requirements, and depletion of the fossil fuels. Methods for producing hydrogen by electrochemical decomposition of water, without using such fossil fuels, are gradually being established for industrial use. However, since these methods also have high electrical power requirements they are problematic from the viewpoint of cost, and thus reduction in electrical power consumption has become a goal. Oxygen is also presently produced by electrolysis of water as is hydrogen, and thus the same problems are involved as with production of hydrogen.

In order to solve these problems, various methods have been proposed for chemically decomposing water in stages. Japanese Unexamined Patent Publication No. 55-21587, for example, discloses a method wherein water is reacted with a halogen to form a hydrogen halide, and then the resulting hydrogen halide is electrolyzed to form hydrogen. According to this method, when a halogen other than fluorine is used, such as chlorine, bromine or iodine, hydrogen is obtained with a much lower voltage than by direct electrolysis of water, and it thus provides the advantage of reducing the amount of electrical energy required.

Nevertheless, since the above-mentioned method involves reacting the halogen with carbon particles and water, a resulting problem has been production of carbon dioxide as a by-product, and thus lower energy efficiency since the carbon is consumed. Another disadvantage of this method is that the reaction efficiency is not always sufficient. Furthermore, although methods involving electrolysis of hydrogen halides have a notably lower energy requirement than direct electrolysis of water, it has been difficult to lower costs to any great degree since electrolysis is still employed.

SUMMARY OF THE INVENTION

It is an object of the present invention to provide a method for generating a hydrogen halide and oxygen from water by a chemical reaction which does not involve electrolysis, a method for producing hydrogen from the hydrogen halide by thermal decomposition, and a method for producing hydrogen and oxygen from water and a halogen by a chemical reaction, which involves a combination of these methods.

DETAILED DESCRIPTION OF THE PREFERRED EMBODIMENT

Figure 1:
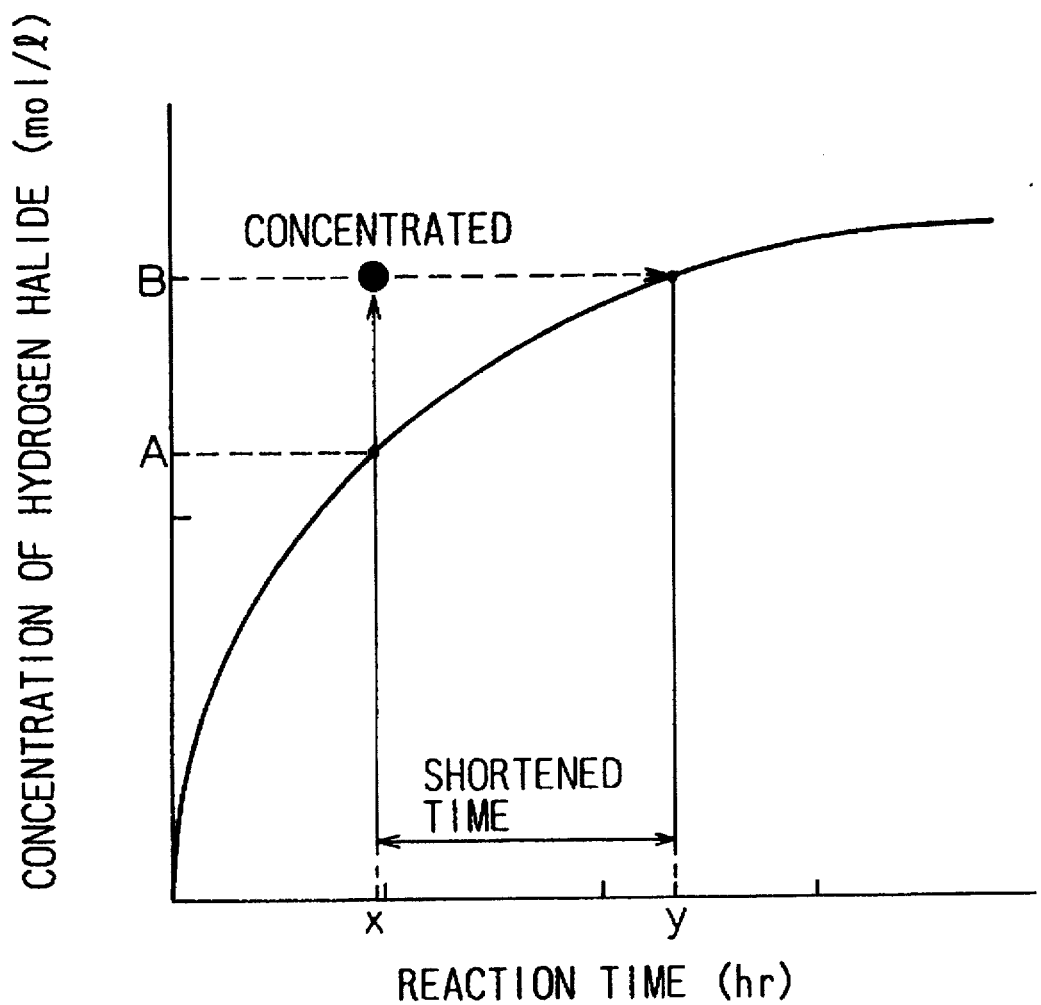
FIG. 1 is a graph showing concentration change with respect to time for a hydrogen halide formed by reaction of a halogen with water.

According to a first embodiment of the present invention, activated carbon is used as the catalyst in a method of producing a hydrogen halide and oxygen by reacting water with a halogen as represented by the chemical equation:

$$H_2O + X_2 \rightarrow 2HX + 1/2 O_2 \quad (1)$$

wherein X is a halogen.

According to a second embodiment of the present invention, supercritical water is used as the water in a method of producing a hydrogen halide and oxygen by reacting water with a halogen as represented by the chemical equation:

$$H_2O + X_2 \rightarrow 2HX + 1/2 O_2 \quad (1)$$

wherein X is a halogen.

According to a third embodiment of the present invention, chromium oxide ($Cr_2O_3$) is used as the catalyst in a method of producing hydrogen by decomposing a hydrogen halide as represented by the chemical equation:

$$2HX \rightarrow H_2 + X_2 \quad (2)$$

wherein X is a halogen.

According to a fourth embodiment of the present invention, in a method of producing oxygen and hydrogen which is a combination of the above reactions (1) and (2), activated carbon is used as the catalyst, water and the halogen are reacted as represented by equation (1) to produce a hydrogen halide and oxygen, and then the resulting hydrogen halide is thermally decomposed as represented by equation (2) using chromium oxide ($Cr_2O_3$) as the catalyst.

According to a fifth embodiment of the present invention, in a method of producing oxygen and hydrogen which is a combination of the above reactions (1) and (2), supercritical water is used as the water, the water and the halogen are reacted as represented by equation (1) to produce a hydrogen halide and oxygen, and then the resulting hydrogen halide is thermally decomposed as represented by equation (2) using chromium oxide ($Cr_2O_3$) as the catalyst.

The present invention is a method for producing a hydrogen halide and oxygen through a chemical reaction without electrolysis, by reaction of water and a halogen as represented by the chemical equation:

$$H_2O + X_2 \rightarrow 2HX + 1/2 O_2 \quad (1)$$

wherein X is a halogen. This reaction is believed to proceed in 2 steps represented by the following chemical equations:

$$H_2O + X_2 \rightarrow HX + HXO \quad (3)$$

$$HXO \rightarrow HX + 1/2 O_2 \quad (4)$$

(X=halogen)

where first water and the halogen react to form a hydrogen halide (HX) and a hypohalic acid (HXO) to a state of equilibrium (equation (3)), and then the hypohalic acid undergoes a self-decomposition reaction to decompose into a hydrogen halide and oxygen (equation (4)). The method described in the aforementioned Japanese Unexamined Patent Publication No. 55-21587 is also based on the same reaction equations. However, in this method of the prior art, carbon particles are added to the reaction system, and this carbon reacts generating carbon dioxide. The mechanism of carbon dioxide generation has not been fully elucidated, but it is believed to be as follows.

The HXO formed in reaction equation (3), being a powerful oxidizing agent, oxidizes the carbon as represented by the following chemical equation:

$$2HXO + C \rightarrow 2HX + CO_2 \quad (5)$$

Also, the HXO formed in equation (3) separates out oxygen by the reaction of equation (4), and this separated oxygen adsorbs onto the carbon as a free radical and reacts with the carbon, thus causing oxidation of the carbon.

$$O_2 + C \rightarrow CO_2 \quad (6)$$

Thus, since carbon is consumed when it is used in the above reaction system (1) in this manner, the result is an undesirable reduction in the energy efficiency of the entire reaction system, and even the reaction efficiency of the reaction itself is not sufficient. The present invention is characterized by using activated carbon as the catalyst, and since this activated carbon is less oxidized by the hydrogen hypohalite compared to the carbon particles, the reaction of equation (4) proceeds to rapidly decompose the hypohalic acid into a hydrogen halide and oxygen. This helps prevent the generation of carbon dioxide which occurs when carbon is used, thus increasing the reaction efficiency between the water and halogen in equation (1) to allow efficient production of the hydrogen halide and oxygen.

The activated carbon is produced by thorough carbonization of a raw material such as charcoal, coconut shell, coal char, etc., followed by activation with a method involving high-temperature treatment with water vapor or impregnation with an aqueous solution of zinc chloride or the like and high-temperature firing, and its surface contains various functional groups including carboxyl and hydroxyl groups. According to the invention any type of activated carbon may be used, but activated carbon with basic surface functional groups is particularly preferred.

It is well-known that rare metal-carrying catalysts exhibit especially high activity in certain reaction systems, but we found that using platinum-carrying catalysts for the activated carbon drastically accelerates the reactions of the above-mentioned equations (3) and (4). As a result, it is believed that the generation of carbon dioxide is inhibited because HXO is decomposed to HX (reaction (4)) before it can react with the activated carbon (reaction of equation (5)).

The decomposition reaction of the HXO of equation (4) is promoted by irradiating light on the reaction system. It is believed that irradiation of light on the reaction system causes the reaction of equation (4) to occur before the reaction of equation (5), thus further inhibiting the generation of carbon dioxide.

Oxygen is produced by the reaction of equation (4), and oxygen dissolved in the reaction system slows the reaction rate by the law of mass action. Also, when oxygen is present in the starting water, this oxygen adsorbs onto the activated carbon catalyst, thus lowering the activity point of the activated carbon and slowing the reaction rate. Conducting the reaction in a reaction system under reduced pressure removes the oxygen in the reaction system and the generated oxygen, thus preventing a slowed reaction rate so that a high reaction rate may be maintained. Nevertheless, when the reaction system is under reduced pressure the halogen is eliminated prior to the reaction. This may be prevented by adsorbing the halogen onto the activated carbon catalyst in advance, and thus hinder elimination of the halogen under the reduced pressure.

The same effect may be achieved by bubbling in an inert gas to remove the oxygen from the reaction system.

FIG. 1 shows the course of hydrogen halide formation according to equation (1). It is seen from this graph that the reaction rate between the halogen and water is high as the reaction begins so that the hydrogen halide concentration increases drastically in the initial stage of the reaction, but the reaction rate gradually decreases. Here, up to time (x) of the initial reaction with the high reaction rate (A mole concentration of hydrogen halide), the unreacted water and halogen are removed from the reaction system, and the halide concentration is concentrated to B moles. Time (y) is normally required to reach a hydrogen halide concentration of B moles, but when this means is employed the time is shortened to time (y-x), thus allowing a shortening of the reaction time and a corresponding reduction in energy. The unreacted water and halogen may be separated out by applying heat, but when the reaction between the water and halogen is conducted at a high reaction temperature (60° C. or higher, and preferably 80° C. or higher), they may be evaporated for separation by the heat of the reaction system itself. Since there are many unreacted components in the separated water and halogen, they may be reacted at a high reaction rate in the initial stage. Thus, by repeating this process, it is possible to react the water and halogen constantly at a high reaction rate.

When the reactions of equation (1) is conducted at a low reaction temperature of lower than 60° C., it is difficult to separate the unreacted water and halogen without heating. Here, a portion of the reaction solution is taken out from the first vat during the reaction and transferred to a second vat and heated until concentrated. The unreacted water and halogen evaporated during this time are returned to the first vat of the original reaction system. By removing only the hydrogen halide produced by this procedure it is possible to maintain a high reaction rate in the first vat based on the law of mass action. That is, the reaction proceeds to the right due to the reduced concentration of the hydrogen halide.

Production of hydrogen by thermal decomposition of a hydrogen halide, particularly hydrogen iodide as represented by the chemical equation:

$$2HX \rightarrow H_2 + X_2$$

is known, and activated carbon has traditionally been used as a catalyst for this reaction as well. The activated carbon used as the catalyst in the reactions of equations (3) and (4) is believed to undergo transfer of electrons with the oxygen separated from the water, and it is therefore subjected to oxidizing action. On the other hand, in the thermal decomposition reaction of the hydrogen halide, the activated carbon is believed to undergo transfer of electrons with the hydrogen separated from the water, and it is therefore subjected to a reducing action. Consequently, by appropriately and alternately switching the activated carbon used in both reactions, the oxidized activated carbon may be reduced and the reduced activated carbon may be oxidized, thus being restored by undergoing opposite reactions.

It was mentioned above that generation of carbon dioxide has been a problem in the tranditional reaction between water and the halogen using the carbon. It is believed that oxygen produced adsorbs onto the activated carbon used as the catalyst and a portion thereof chemically reacts to form the carbon dioxide. Thus, to prevent oxygen from adsorbing onto the activated carbon, a negative electric potential is imparted to the activated carbon.

As stated above, another cause of the generation of carbon dioxide, in addition to reaction of the oxygen with the activated carbon, is believed to be oxidation of the activated carbon by the powerful oxidizing agent HXO produced in equation (3). Thus, in order to inhibit the oxidizing action of the HXO, a reducing agent or oxygen adsorbent is added to the reaction system. The reducing agent must be easily oxidized by the activated carbon without reacting with the highly active halogen or hydrogen halide. In addition, it is preferably one which may be restored to the original reducing agent after being oxidized, by removal of the oxygen by heating at a relatively low temperature. Examples of such reducing agents include cobalt oxide (CoO), tin oxide (SnO), tungsten oxide (WO$_2$), lead oxide (Pb$_2$O$_3$), platinum oxide (PtO) and titanium (Ti). The oxygen adsorbent must be one which does not react with the highly active halogen or hydrogen halide, and is preferably restorable. Examples of such oxygen adsorbents include nickel oxide (NiO) and carbon-iron alloy.

Increasing the reaction rate between the water and the halogen is effective for inhibiting generation of carbon dioxide, but the reaction rate may also be increased by using supercritical water as the water. Supercritical is a state exceeding the critical pressure, and supercritical water is water at a temperature of 300° C. or higher and a pressure of 200 kg/cm$^2$ or greater. Supercritical water has very high reactivity, and when it is reacted with the halogen the reaction proceeds satisfactorily without using a catalyst. Generation of carbon dioxide may thus be prevented because carbon is not added.

As mentioned above, according to the present invention it is possible to produce a hydrogen halide and oxygen by an efficient chemical reaction between water and a halogen without electrolysis, using activated carbon as the catalyst or using supercritical water as the water. The hydrogen halide obtained by this method may then be decomposed by a widely used method such as electrolysis to obtain hydrogen, and thus less energy is required than with direct electrolysis of water.

The present invention provides hydrogen by thermal decomposition of a hydrogen halide utilizing the reaction represented by the following chemical equation:

$$2HX \rightarrow H_2 + X_2 \qquad (2)$$

(X=halogen)

Since decomposition of a hydrogen halide, specifically, HBr or HCl, requires heating to 1000° C. or above, electrolysis has been necessary to obtain hydrogen by the prior art. However, the thermodynamic efficiency of the electrical power in the electrolysis of a hydrogen halide is too low. Another problem has been the high cost of the electrical power.

In the reactions described above, chromium oxide (Cr$_2$O$_3$) may be used as a catalyst to promote decomposition of the hydrogen halide and thus obtain hydrogen by thermal decomposition at a temperature of 700° C. or below without electrolysis. This method is carried out by placing the aqueous hydrogen halide solution and chromium oxide in the reactor and applying heat. The heating temperature is sufficient at 700° C. or below, as the reaction will occur at 100° C. or somewhat higher, preferably about 140° C.

There are no particular restrictions on the hydrogen halide used in the reaction. It is possible to use, for example, a hydrogen halide which is an industrial chemical by-product, or a hydrogen halide which is produced by the reaction between a halogen and water as represented by the above equation (1).

In addition, the above methods may be combined to produce oxygen and hydrogen from water by a simple chemical reaction without any electrolysis at all. That is, oxygen and a hydrogen halide may be obtained by conducting the reaction of equation (1) with activated carbon as the catalyst or supercritical water as the water. The resultant hydrogen halide may then be thermally decomposed using chromium oxide as a catalyst in the method of equation (2) to obtain hydrogen. It is believed that activated carbon can also act as a catalyst in the method of equation (2).

EXAMPLE 1

Petroleum coke as the carbon material was treated with KOH and then heated to 600°–800° C. to obtain activated carbon No. 1 having a specific surface of 2000 m$^2$/g. This activated carbon No. 1 was then heat treated at 700° C. under a nitrogen gas flow to obtain activated carbon No. 2 having a specific surface of 1960 m$^2$/g. This activated carbon No. 2 was then treated in 8N nitric acid for 10 hours at a temperature of at least 90° C. to obtain activated carbon No. 3 having a specific surface of 1930 m$^2$/g. Bromine was dissolved in water to prepare 120 mmol/l bromine water, after which 0.5 g of each of the activated carbon Nos. 1–3 was added to 100 ml of the bromine water and allowed to stand at 60° C. for 24 hours, and the gas produced during that time was collected and its composition analyzed by gas chromatography. The results are shown in Table 1.

TABLE 1

| Name | Proportion CO$_2$ | Proportion O$_2$ |
| --- | --- | --- |
| Natural graphite | 98–99 | 1–2 |
| Coke (non-graphite) | 98–99 | 1–2 |
| Activated carbon No.1 | 75 | 25 |
| Activated carbon No.2 | 85 | 15 |
| Activated carbon No.3 | 95 | 5 |

As is clear from Table 1, when activated carbon was used as the catalyst as opposed to natural graphite and coke, the oxygen yield was greatly increased, while generation of carbon dioxide was minimized.

The proportions of surface functional groups of the activated carbon Nos. 1–3 were measured, and the results are shown in Table 2 below.

TABLE 2

| Surface functional groups | Activated carbon No.1 | Activated carbon No.2 | Activated carbon No.3 |
| --- | --- | --- | --- |
| Carboxyl groups (R-COOH) | 0.32 | 0.38 | 1.41 |
| Lactone groups (R-OCO) | 0.18 | 0.23 | 0.28 |
| Phenolic hydroxyl groups (R-OH) | 0.62 | 0.52 | 0.72 |
| Basic groups | 0.54 | 0.21 | 0.07 |

Using activated carbon No. 1 resulted in the lowest amount of carbon dioxide, and although there was little difference between activated carbon No. 1 and the other activated carbons No. 2 and No. 3 with respect to the proportion of acidic functional groups, i.e. carboxyl groups, lactone groups and phenolic hydroxyl groups, with the exception of carboxyl groups, the proportion of basic functional groups was much higher in the activated carbon No. 1, and the presence of the basic functional groups is believed to contribute to the inhibition of carbon dioxide generation. In other words, Table 1 demonstrates the superiority of activated carbon with basic surface functional groups. Virtually no such functional groups are present in natural graphite and coke.

EXAMPLE 2

120 mmol/l chlorine water was prepared, and 0.5 g of each of the carbon materials used in Example 1 was added to 100 ml of the chlorine water and allowed to stand at room temperature (25° C.) for 24 hours. The gas produced during that time was collected and the composition of the collected gas was analyzed by gas chromatography. The results are shown in Table 3.

TABLE 3

| Name | Proportion CO$_2$ | Proportion O$_2$ |
| --- | --- | --- |
| Natural graphite | 98–99 | 1–2 |
| Coke (non-graphite) | 98–99 | 1–2 |
| Activated carbon No.1 | 90 | 10 |
| Activated carbon No.2 | 92 | 8 |
| Activated carbon No.3 | 96 | 4 |

EXAMPLE 3

25 g of iodine, 90 g of water and 0.5 g of each of the carbon materials in Example 1 were placed in a reactor and reacted at 120° C. for 4 hours. The gas produced during the reaction was collected and its composition analyzed by gas chromatography. The results are shown in Table 4.

TABLE 4

| Name | Proportion CO$_2$ | Proportion O$_2$ |
| --- | --- | --- |
| Natural graphite | 98–99 | 1–2 |
| Coke (non-graphite) | 98–99 | 1–2 |
| Activated carbon No.1 | 72 | 28 |
| Activated carbon No.2 | 82 | 18 |
| Activated carbon No.3 | 92 | 8 |

As is clear from Tables 3 and 4, when chlorine and iodine were used, as when bromine was used, the activated carbon accelerated the production of oxygen while inhibiting the generation of carbon dioxide, and the effect was considerable for activated carbon with basic surface functional groups.

EXAMPLE 4

Bromine was added to water to prepare 150 mmol/l bromine water. A 0.5 g portion of each of the activated carbons listed in Table 3 was added to 100 ml of the bromine water and reacted at 20° C., and the amount of hydrogen bromide produced after one hour was measured. Also, the gas produced during that reaction was collected and its composition analyzed by gas chromatography. The results are shown in Table 5. Since the gas was not collected in-line but captured in a bag and then subjected to gas chromatography, the error tends to be biased to more O$_2$ gas.

TABLE 5

| Test sample | Specific surface (m$^2$/g) | HBR yield (mmol/l) | Proportion O$_2$ (%) | Proportion CO$_2$ (%) |
| --- | --- | --- | --- | --- |
| Base activated carbon | 1070 | 22 | 20 | 80 |
| 5% Pt-carrying activated carbon | 940 | 32 | 40 | 60 |
| 5% Ru-carrying activated carbon | 1045 | 22 | 30 | 70 |
| 5% Rh-carrying activated carbon | 831 | 14 | 20 | 80 |

As Table 5 clearly shows, the activated carbons carrying ruthenium and rhodium resulted in a lower yield of hydrogen bromide than the base carbon, and no inhibiting effect was found on carbon dioxide generation; however, the activated carbon carrying platinum improved the hydrogen bromide yield, and inhibited generation of carbon dioxide. The same effect was found when chlorine and iodine were used instead of bromine.

EXAMPLE 5

Figure 2:
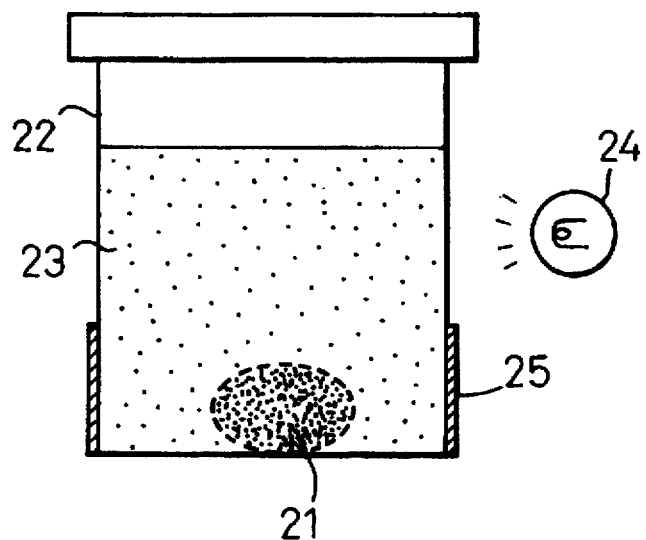
FIG. 2 is a sketch of an experiment wherein light is irradiated from the side of a reaction vat containing water, bromine and activated carbon.
Figure 3:
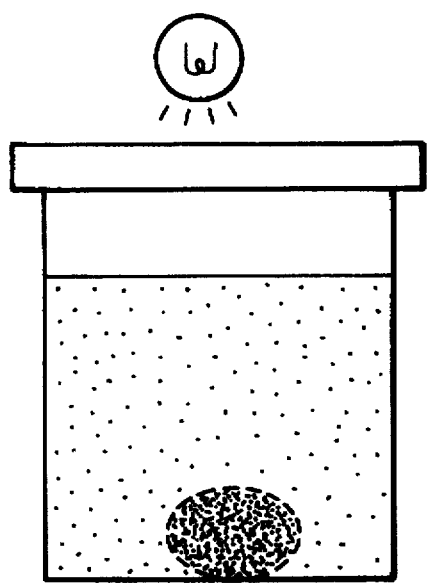
FIG. 3 is a sketch of an experiment wherein light is irradiated from the top of a reaction vat containing water, bromine and activated carbon.

Bromine was dissolved in water in a quartz glass reaction container 22 to prepare 120 mmol/l bromine water 23, and 0.5 g of the activated carbon No. 1 prepared in Example 1 was added to 100 ml of the bromine water and allowed to stand at 60° C. for 24 hours. Next, a xenon lamp 24 with a spectrum near that of sunlight was used to irradiate light on the reaction container as shown in FIGS. 2 and 3. In different tests where light was not irradiated, where light was irradiated from the side of the reaction container and a cover 25 was placed on the bottom of the reaction container 22 so that light would not directly irradiate the activated carbon 21

(FIG. 2), and where the light was irradiated from the top of the reaction container so that the light would also contact the activated carbon (FIG. 3), the gas produced was collected and its composition analyzed by gas chromatography. The results are shown in Table 6.

TABLE 6

| Condition | Proportion $CO_2$ | Proportion $O_2$ |
|---|---|---|
| No light irradiation | 75 | 25 |
| Light irradiated from side | 65 | 35 |
| Light irradiated from directly above | 60 | 40 |

Irradiation of light on the reaction system inhibited generation of carbon dioxide, and the effect was particularly enhanced by irradiating the light directly on the activated carbon.

EXAMPLE 6

A 16 g portion of bromine was added to 0.5 g of activated carbon, and the mixture was allowed to stand at 20° C. for 15 minutes to adsorb the bromine onto the activated carbon. Next, 84 ml of water was added gently to the mixture which was then subjected to vacuum suction. Equilibrium was attained when the degree of vacuum reached 25 Pa, but no elimination of bromine was found. On the other hand, when the vacuum suction was performed immediately after adding the bromine to the activated carbon without allowing it to stand, elimination of bromine began when the degree of vacuum reached 45 Pa. After standing for 15 minutes, both the solution subjected to vacuum suction and the solution not subjected to vacuum suction were allowed to react for one hour at 100° C., and the amount of hydrogen bromide produced was measured. The results are shown in Table 7.

TABLE 7

| Vacuum suction | HBr concentration (mmol/l) |
|---|---|
| Yes | 750 |
| No | 600 |

The hydrogen bromide yield was improved by conducting the reaction in a reduced pressure atmosphere. No effect was found with solid iodine at normal temperature, but iodine and chlorine near their boiling points had the same effect by adsorption onto the activated carbon.

EXAMPLE 7

Bromine water was prepared by adding bromine to water through which nitrogen gas had been bubbled. The amount of dissolved oxygen in the nitrogen gas-bubbled water was 0.1 mg/l, which corresponds to 1% of the oxygen saturation amount of 8.84 mg/l at 20° C. The bromine solubility in the nitrogen gas-bubbled water was 150 mmol/l. Bromine water was also prepared by adding bromine to water through which air had been bubbled. The amount of dissolved oxygen in the air-bubbled water was 8.4 mg/l (98% of the oxygen saturation at 20° C.), and the bromine solubility in this water was 120 mmol/l. Thus, it was possible to increase the halogen concentration in the water by bubbling in an inert gas such as nitrogen.

Figure 4:
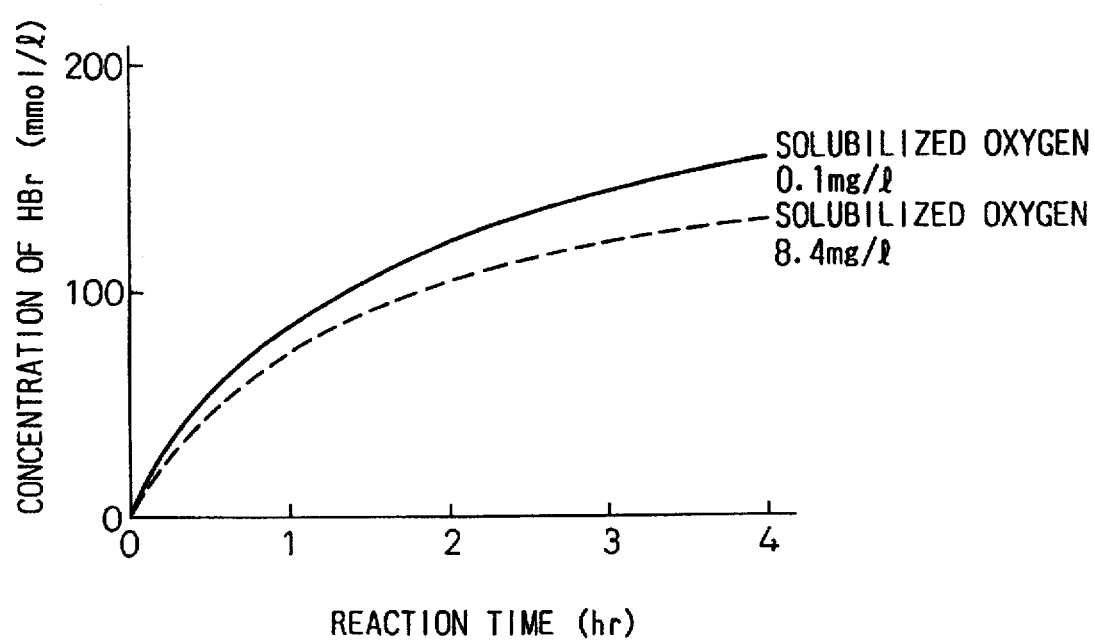
FIG. 4 is a graph showing the effect on the production rate of the hydrogen halide by bubbling an inert gas through the water.

The 2 types of water were adjusted to a bromine concentration of 100 mmol/l to prepare 2 different samples of bromine water, 0.5 g of activated carbon was added thereto and reacted at 60° C., and the increase in the amount of HBr was measured. The results are shown in FIG. 4. The graph clearly shows that the reaction system in the water from which oxygen had been removed by bubbling in nitrogen had a higher rate of HBr production. The HBr yield was also higher. This effect may be achieved not only with bromine but also with chlorine and iodine.

EXAMPLE 8

Figure 5:
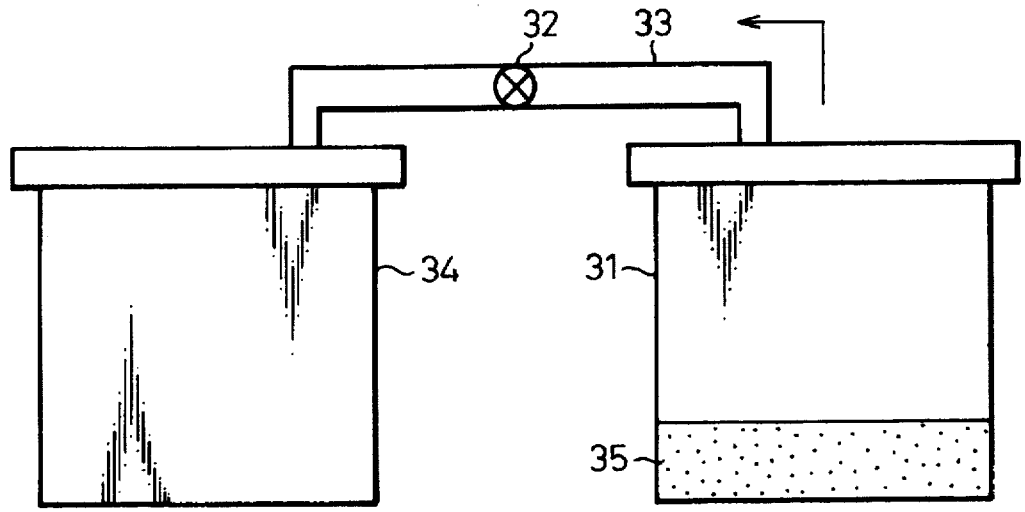
FIG. 5 is a sketch of the apparatus used in Example 8.

In a 500 ml Teflon-coated SUS first reaction vat 31 as shown in FIG. 5 there were placed 60 grams of water, 16 g of bromine and 0.5 g of activated carbon, and after vacuum suction they were reacted by heating at 80° C. After a one hour reaction, the hydrogen bromide yield and residual bromine concentration in the reaction mixture 35 in the first reaction vat 31 were measured. After this one hour reaction was complete, the valve 32 was opened and the evaporated bromine and water were transferred to a Teflon-coated SUS second reaction vat 34 via a conduit 33, after which the hydrogen bromide concentration and residual bromine concentration in the first reaction vat 31 were again measured. The results are shown in Table 8.

TABLE 8

| Time of measurement | HBr concentration (mmol/l) | Residual $Br_2$ concentration (mmol/l) |
|---|---|---|
| After reaction | 590 | 1020 |
| After evaporation | 922 | 12 |

A reaction was also continued without transferring the bromine and water from the first reaction vat, upon which another 4 hours were required to reach the same hydrogen bromide concentration (922 mmol/l) obtained by evaporating the unreacted water and bromine to transfer them to the second reaction vat, and thus a time reduction of 4 hours had been achieved. The same effect was found with chlorine and iodine.

EXAMPLE 9

Figure 6:
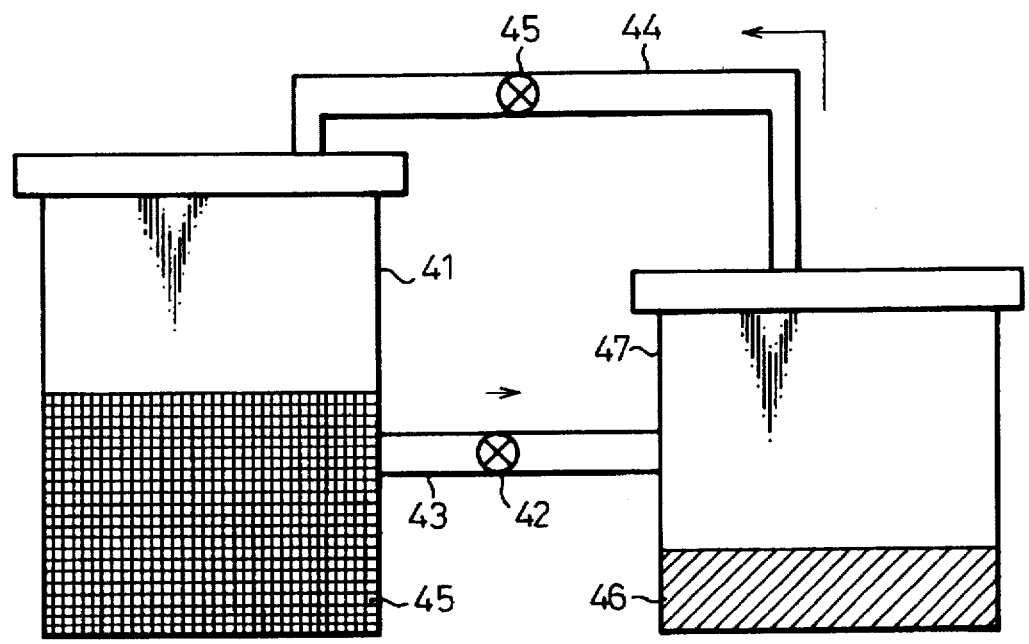
FIG. 6 is a sketch of the apparatus used in Example 9.

In a Teflon-coated SUS first reaction vat 41 as shown in FIG. 6 there were placed 500 ml of 120 mmol/l bromine water and 5 g of activated carbon, and the mixture was heated at 60° C. After one hour reaction, the valve 42 was opened to transfer 50 ml of the reaction mixture 45 through a conduit 43 to a Teflon-coated SUS second reaction vat 47. At the second reaction vat 47 the reaction mixture 46 was heated at about 100° C. for concentration. The unreacted water and bromine which evaporated at this time was returned through another conduit 44 back to the first reaction vat 41. The composition of the reaction mixture when transferred from the first reaction vat 41 to the second reaction vat 47 was 90 mmol/l hydrogen bromide and 70 mmol/l bromine, and after concentration in the second reaction vat 47 it was 1.7 mol/l hydrogen bromide and 0 mmol/l bromine, with a volume of 2.5 ml. Also, the composition of the reaction mixture in the first reaction vat 41 after the unreacted water and bromine had been returned was 83 mmol/l hydrogen bromide and 76 mmol/l bromine, and thus the hydrogen bromide concentration had decreased while the bromine concentration had increased. It is known that the higher the concentration of concentrated hydrogen bromide, the lower the electrolytic voltage, and 8.6 mol/l of an azeotropic composition is obtained if the temperature of the second reaction vat is set to the azeotropic temperature of 125° C. A highly concentrated solution is also obtained if the azeotropic temperature is set when using chlorine and iodine as well.

EXAMPLE 10

Figure 7:
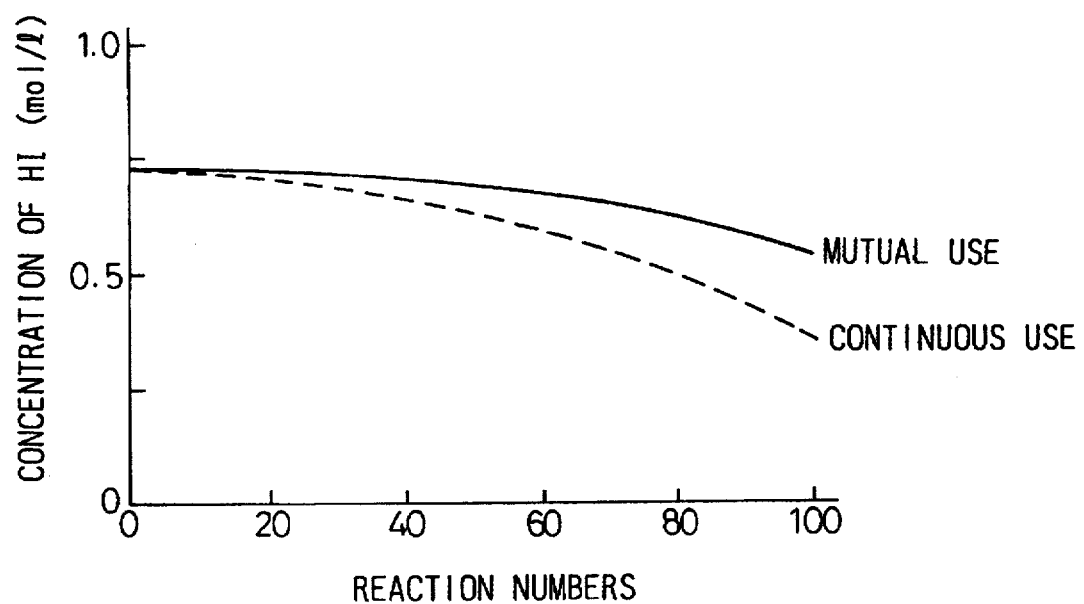
FIG. 7 is a graph showing the concentrations of hydrogen iodide generated with continuous use and alternate use of the catalyst of Example 10.
Figure 8:
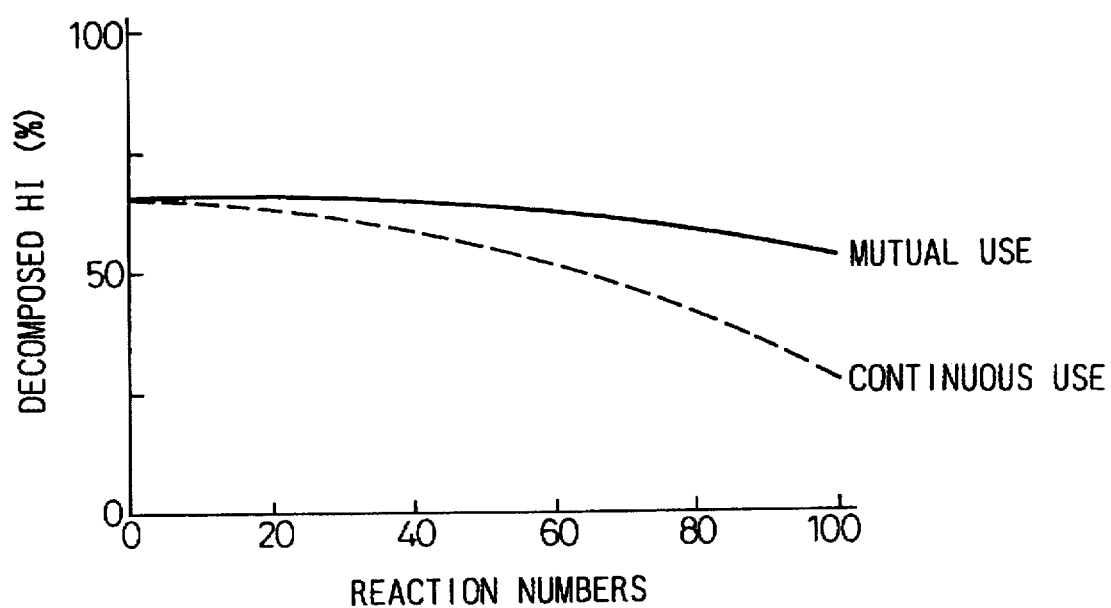
FIG. 8 is a graph showing the decomposition rates of hydrogen iodide with continuous use and alternate use of the catalyst of Example 10.

25 g of iodine, 90 g of water and 0.5 g of activated carbon carrying platinum were placed in a reactor and reacted at 120° C. for 4 hours. The resulting hydrogen iodide concentration was 0.74 mol/l. The reaction mixture was distilled and a 47.5% azeotropic composition of hydrogen iodide was taken out. The activated carbon in the reaction mixture was then heated at 200° C. for 4 hours under a nitrogen gas flow to remove the iodine adsorbed onto the activated carbon. The azeotropic hydrogen bromide was gasified and separated, and subjected to thermal decomposition at 200° C. using the activated carbon from which the iodine had been removed. This procedure of formation and decomposition of hydrogen bromide was repeated using the same catalyst, and the yield and decomposition rate of the hydrogen bromide were measured, as shown in FIGS. 7 and 8. Also, separate catalysts were used for the formation and decomposition of hydrogen bromide, and the yield and decomposition rate of the hydrogen bromide were measured in the same manner. Since the amount of activated carbon decreased by about 0.5% after one cycle in the step of forming the hydrogen bromide, this portion was replenished each time.

As clearly shown in FIGS. 7 and 8, by alternating use of the activated carbon for the formation and decomposition of the hydrogen bromide, it was possible to prevent reduction in its efficiency as a catalyst for formation and decomposition of the hydrogen bromide, compared to its continuous use in each step.

EXAMPLE 11

Figure 9:
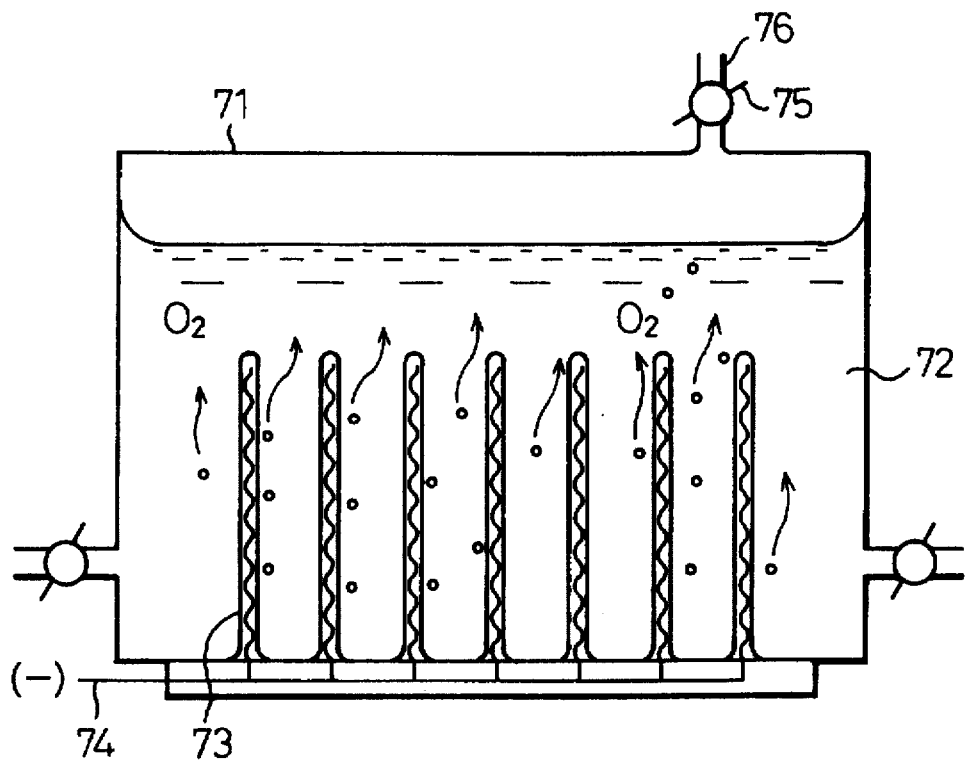
FIG. 9 is a sketch of the apparatus used in Example 11.
Figure 10:
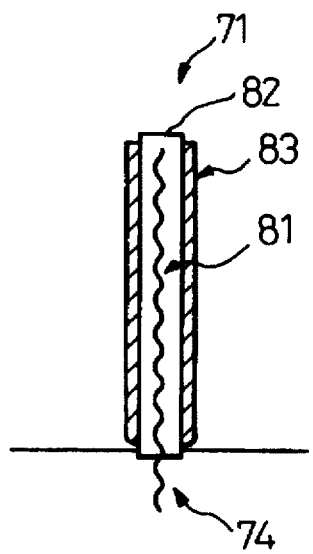
FIG. 10 is a detailed sketch of one of the carbon plates of FIG. 9.

A reaction mixture 72 comprising bromine, water and potassium bromide was placed in a reaction vat 71 as shown in FIG. 9. The catalyst used was an activated carbon-based cloth material, i.e. an activated carbon cloth 83. A carbon plate 73 was provided to distribute an equal potential over the entire activated carbon cloth. The structure of the carbon plate 73 is shown in FIG. 10. The carbon plate 73 was formed by inserting a metal mesh 81 made of copper, silver, nickel or the like, between a plastic plate 82 having a thickness of 0.5–2 mm (formed by kneading carbon black and a polyethylene resin, and extrusion molding), and thermo-compression bonding the activated carbon cloth 83 to both surfaces using a hot press or the like. This construction provides an equal potential throughout the entire catalyst area, without allowing the reaction mixture to directly contact with the metal.

A number of such carbon plates 73 were arranged in the reaction vat as shown in FIG. 9, and a constant negative potential of from −0.1 to −0.5 V was applied to the carbon through a wire 74. No hydrogen ion reduction-attributable hydrogen gas generation occurred with this micropotential. Since virtually no current flows upon application of voltage to the carbon plates 73 in this system, the electrical consumption due to the voltage application is practically negligible.

The reaction was conducted in this manner, and the generated gas was collected into a conduit 76 through a valve 75 and its composition was analyzed by gas chromatography. Gases were collected using the same system, but with no potential applied to the carbon plates 73, with light irradiated on the system with no potential applied, and with light irradiated on the system with a potential applied, and their compositions were analyzed. The results are shown in Table 9.

TABLE 9

| Conditions | Proportion $CO_2$ | Proportion $O_2$ |
|---|---|---|
| No light irradiation, no potential difference | 80 | 20 |
| No light irradiation, potential difference | 70 | 30 |
| Light irradiation, no potential difference | 40 | 60 |
| Light irradiation, potential difference | 35 | 65 |

As this table shows, application of a negative electric potential to the catalyst carbon plates clearly inhibited generation of carbon dioxide.

EXAMPLE 12

In an autoclave there were placed 0.5 g of activated carbon, 16 g of bromine, 84 g of water and 15 g of cobalt oxide (CoO) powder as a reducing agent, and these were heated for one hour at 140° C. in a vacuum. After returning the reaction mixture to room temperature, the generated gas was collected and analyzed by gas chromatography to determine its composition. The amount of gas generation was also measured before and after the reaction. Because of the high vapor pressure of bromine, the reaction solution was brought to −10° C. and the amount of gas generation was calculated from the differential pressure at that temperature. The same experiment was also conducted without using the reducing agent. The results are shown in Table 10.

TABLE 10

| | Amount of gas generation | | HBR concentration and reaction rate | |
|---|---|---|---|---|
| | $CO_2$ gas | $O_2$ gas | HBr concentration | Reaction rate (%) |
| With reducing agent (CoO) | 50 cc | 50 cc | 1.0 mol/l | 50 |
| Without reducing agent | 350 cc | 38 cc | 0.75 mol/l | 38 |

(Note: The HBr reaction rate is the rate of conversion of the added $Br_2$ to HBr.)

By using the reducing agent it was possible to reduce the amount of carbon dioxide generation by a factor of 1/7. That is, the degree of oxidation of the activated carbon had been reduced a factor of 1/7. The hydrogen bromide concentration after the reaction was also higher. This is thought to be a result of promoted decomposition of HBrO.

About 25% of the CoO used here as the reducing agent had been converted to $Co_2O_3$ by completion of the reaction. This CoO and $Co_2O_3$ may be heated to separate oxygen from the $Co_2O_3$ for its restoration. That is, after reaction the reaction solution was removed and the CoO and $Co_2O_3$ were thoroughly washed and pre-dried, and then subjected to vacuum deairing to remove the bromine. Heating was then performed at 900° C. for one hour to separate the oxygen. In order to prevent oxidation of the activated carbon at this time, the activated carbon is preferably separated from the reducing agent before its restoration. The same effect was achieved with chlorine and iodine.

EXAMPLE 13

An experiment was conducted in the same manner as in Example 11, except for addition of 15 g of titanium powder as a reducing agent. The results of compositional analysis of the resultant gas are shown in Table 11.

TABLE 11

| | Amount of gas | | HBR concentration and reaction rate | |
|---|---|---|---|---|
| | generation | | HBr | Reaction |
| | $CO_2$ gas | $O_2$ gas | concentration | rate (%) |
| With reducing agent (Ti) | 50 cc | 50 cc | 1.0 mol/l | 50 |
| Without reducing agent | 350 cc | 38 cc | 0.74 mol/l | 38 |

(Note: The HBr reaction rate is the rate of conversion of the added $Br_2$ to HBr.)

As in Example 12, by using the titanium reducing agent it was possible to reduce the amount of carbon dioxide generation by a factor of 1/7. The hydrogen bromide concentration after the reaction was also higher. About 25% of the titanium had been converted to titanium oxide ($TiO_2$) by completion of the reaction.

EXAMPLE 14

An experiment was conducted in the same manner as in Example 12, except for addition of 7.5 g of nickel oxide (NiO) powder as an oxygen adsorbent instead of the reducing agent, and the results of analysis of the resultant gas are shown in Table 12.

TABLE 12

| | Amount of gas | | HBR concentration and reaction rate | |
|---|---|---|---|---|
| | generation | | HBr | Reaction |
| | $CO_2$ gas | $O_2$ gas | concentration | rate (%) |
| With adsorbent (NiO) | 50 cc | 0 cc | 1.0 mol/l | 50 |
| Without adsorbent | 350 cc | 38 cc | 0.75 mol/l | 38 |

(Note: The HBr reaction rate is the rate of conversion of the added $Br_2$ to HBr.)

By using the oxygen adsorbent it was possible to reduce the amount of carbon dioxide generation by a factor of 1/7. The hydrogen bromide concentration after the reaction was also higher. After the reaction, the nickel oxide held the oxygen in the form of NiO-O, and it was restored to NiO by vacuum drying for one hour at 200° C.

EXAMPLE 15

In a reaction vat lined with hastelloy X platinum there were placed 18 g of water and 16 g of bromine, and the mixture was reacted for 30 minutes by heating the entirety at 300° C. under 400 kg/cm² without using a catalyst. After cooling, the hydrogen bromide and bromine concentrations of the reaction mixture were measured. The results were 25 mol/l of hydrogen bromide and 3.1 mol/l of bromine, showing a rather high hydrogen bromide concentration. Since absolutely no activated carbon catalyst was used, absolutely no carbon dioxide was generated. The same reaction is possible using chlorine and iodine.

EXAMPLE 16

In a 500 ml Ti pressure container there were placed 50 ml of 8.6 mol/l hydrobromic acid and 0.5 g of $Cr_2O_3$ powder.

The hydrobromic acid had been thoroughly bubbled with the inert gas Ar beforehand to remove the dissolved oxygen. The remaining space in the container was also displaced with the inert gas Ar. After one hour of heating at 140° C. it was allowed to stand to return to room temperature, the generated gas was collected, and after being passed through water to prevent contamination of the bromine, the composition was measured by gas chromatography. The amount of gas generation was also measured before and after the reaction. The reaction was conducted in the same manner without adding the $Cr_2O_3$, and the composition and yield of the generated gas were measured. The results are shown in Table 13.

TABLE 13

| | With $Cr_2O_3$ | Without $Cr_2O_3$ |
|---|---|---|
| Amount of hydrogen gas generation (ml) | 60 | 0 |

As shown in Table 13, when no $Cr_2O_3$ powder was added, no hydrogen was detected even upon heating. Generation of hydrogen gas was confirmed when $Cr_2O_3$ powder was added.

We claim:

1. A method of producing a hydrogen halide and oxygen by reacting water with a halogen in a reaction system as represented by the chemical equation:

$$H_2O + X_2 \rightarrow 2HX + 1/2 O_2 \quad (1)$$

wherein X is a halogen, wherein activated carbon is used as a catalyst and wherein the reaction is performed in an aqueous solution while removing oxygen from the reaction system.

2. The method of claim 1, wherein the activated carbon contains basic surface functional groups.

3. The method of claim 1, wherein the activated carbon carries platinum.

4. The method of claim 1, wherein light is irradiated on the reaction system during the reaction process.

5. The method of claim 1, wherein the halogen is adsorbed onto the activated carbon in advance and the halogen adsorbed onto the activated carbon is reacted with the water in a reduced pressure atmosphere.

6. The method of claim 1, wherein an inert gas is bubbled through the reaction system.

7. The method of claim 1, wherein during the reaction unreacted water and the halogen are separated from the reaction system and reacted in a separate reaction system.

8. The method of claim 1, wherein during the reaction a portion of the reaction system is removed, unreacted water and the halogen are removed from said portion, and the unreacted water and halogen are returned to the original reaction system.

9. The method of claim 1, wherein the activated carbon used is alternately switched between the activated carbon used in the reaction between the water and the halogen and the activated carbon used in a hydrogen halide decomposition reaction.

10. The method of claim 1, wherein a negative electric potential is applied to the activated carbon.

11. The method of claim 1, wherein a reducing agent is added which does not react with the halogen or the hydrogen halide in the reaction system.

12. The method of claim 1, wherein an oxygen adsorbent is added which does not react with the halogen or the hydrogen halide in the reaction system.

13. A method of producing a hydrogen halide and oxygen by reacting water with a halogen in a reaction system as represented by the chemical equation:

$$H_2O + X_2 \rightarrow 2HX + 1/2O_2 \qquad (1)$$

wherein X is a halogen, wherein supercritical water is used as the water.

14. A method of producing hydrogen by thermally decomposing a hydrogen halide in a reaction system as represented by the chemical equation:

$$2HX \rightarrow H_2 + X_2 \qquad (2)$$

wherein X is a halogen, wherein chromium oxide ($Cr_2O_3$) is used as a catalyst.

15. A method of producing a hydrogen halide and oxygen by reacting water with a halogen in a reaction system and then producing hydrogen by thermally decomposing the hydrogen halide, as represented by the chemical equations:

$$H_2O + X_2 \rightarrow 2HX + 1/2O_2 \qquad (1)$$

$$2HX \rightarrow H_2 + X_2 \qquad (2)$$

wherein X is a halogen, wherein activated carbon is used as a catalyst in equation (1) and chromium oxide ($Cr_2O_3$) is used as a catalyst in equation (2), wherein equation (1) is performed in an aqueous solution while removing oxygen from the system.

16. A method of producing a hydrogen halide and oxygen by reacting water with a halogen in a reaction system and then producing hydrogen by decomposing the hydrogen halide, as represented by the chemical equations:

$$H_2O + X_2 \rightarrow 2HX + 1/2O_2 \qquad (1)$$

$$2HX \rightarrow H_2 + X_2 \qquad (2)$$

wherein X is a halogen, wherein supercritical water is used as the water in equation (1) and chromium oxide ($Cr_2O_3$) is used as a catalyst in equation (2).

* * * * *